United States Patent [19]

Hoppmanns et al.

[11] Patent Number: 4,639,801
[45] Date of Patent: Jan. 27, 1987

[54] LOADING MECHANISM FOR A MAGNETIC TAPE CASSETTE APPARATUS

[75] Inventors: Rolf D. Hoppmanns; Walter Steup; Willibald Wieczorek, all of Krefeld, Fed. Rep. of Germany; Franz Beitler, Vienna, Austria

[73] Assignee: U.S. Philips Corporation, New York, N.Y.

[21] Appl. No.: 628,701

[22] Filed: Jul. 9, 1984

[30] Foreign Application Priority Data

Jul. 12, 1983 [DE] Fed. Rep. of Germany ....... 3325053

[51] Int. Cl.$^4$ .............................................. G11B 5/008
[52] U.S. Cl. .................................. 360/96.5; 360/96.1
[58] Field of Search ............................ 360/96.1, 96.5

[56] References Cited

U.S. PATENT DOCUMENTS

| | | | |
|---|---|---|---|
| 3,854,784 | 12/1974 | Hunt et al. | 312/319 |
| 3,904,149 | 9/1975 | Suzuki | 360/96.5 |
| 4,308,562 | 12/1981 | Negishi | 360/96.5 |
| 4,319,292 | 3/1982 | Katoh | 360/96.5 |
| 4,369,474 | 1/1983 | Kamimura et al. | 360/96.5 |
| 4,447,838 | 5/1984 | Kato | 360/96.5 |
| 4,467,378 | 8/1984 | Schatteman | 360/96.5 |

FOREIGN PATENT DOCUMENTS 3229490  8/1982  Fed. Rep. of Germany .

Primary Examiner—A. Michael Chambers
Attorney, Agent, or Firm—David R. Treacy

[57] ABSTRACT

A magnetic tape cassette apparatus has a holder into which a cassette can be pushed against an ejection slide, to a pushed-in position. A lifting device moves the holder from a position for receiving or ejecting a cassette, to an operating position. As the ejection slide is moved to the pushed-in position, a pivoting catch engages the slide to lock it and hold it during movement of the lifting device to the operating position. Upon reverse movement of the lifting device to a position for ejecting the cassette, a tilting lever engages a lug mounted to the apparatus frame, and pivots so as to pivot said catch and unlock the ejection slide. Ejection slides to each side of the holder may be interconnected by a rack and pinion arrangement having a brake for slowing rotation of the pinion shaft during ejection.

10 Claims, 6 Drawing Figures

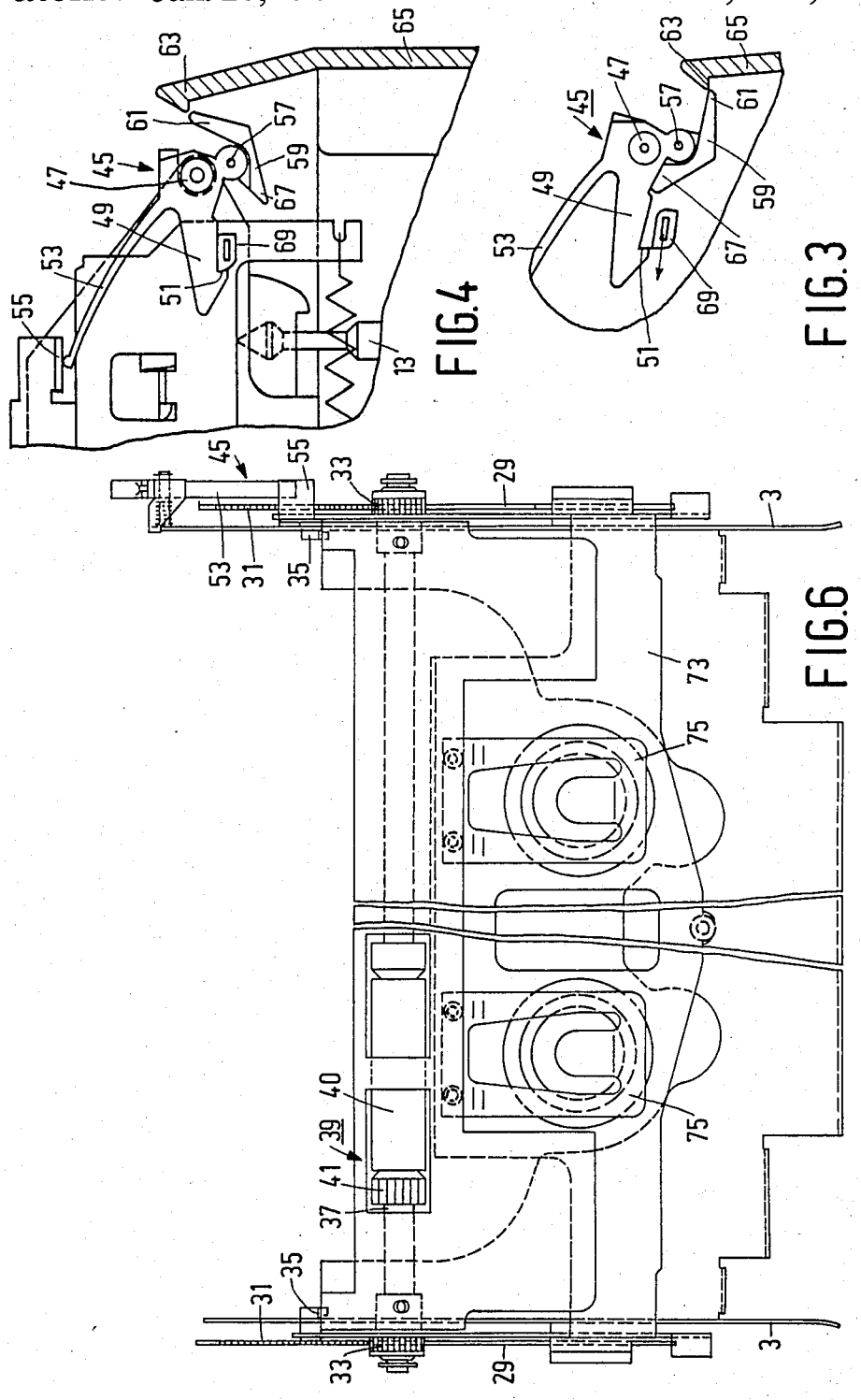

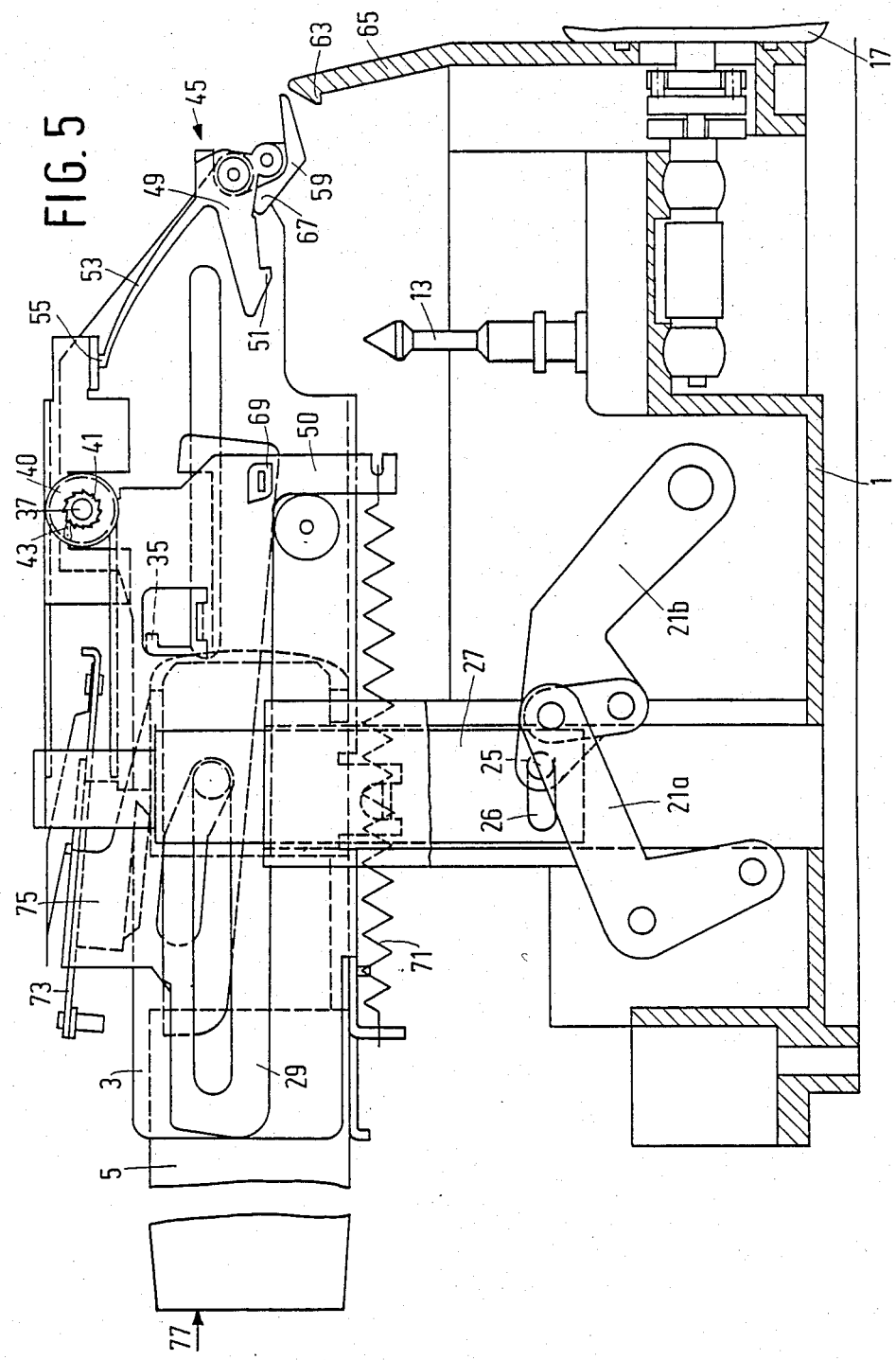

LOADING MECHANISM FOR A MAGNETIC TAPE CASSETTE APPARATUS

BACKGROUND OF THE INVENTION

The invention relates to a loading mechanism for a magnetic tape cassette apparatus with a lifting device and with a frame-shaped cassette holder which can be moved up and down by the lifting device. The cassette holder comprises an ejection slide which can be locked in a pushed-in position.

Loading mechanisms for the loading and unloading of magnetic tape cassettes in a magnetic tape cassette apparatus have already been known. In the case of such a device a cassette is frequently pushed from the front of the magnetic tape cassette apparatus into the cassette holder and then moved downwards vertically by the loading device in order to bring the cassette into the operating position. In the operating position the cassette placed in the apparatus is centered with the aid of centering pins. For cassette removal, the motor-driven lifting device lifts the cassette contained in the cassette holder out of the operating position into the eject position. When being moved downwards into the operating position the cassette must be locked in the cassette holder.

From DE-AS No. 2357445, to which U.S. Pat. No. 3,854,784 corresponds, a loading device for a magnetic tape cassette apparatus is known in which the locking takes place by means of a so-called "Shadow catch" mechanism, comprising a heart-shaped groove and a pin which scans this heart-shaped groove. When a cassette is pushed into the cassette holder by hand, the pin locks in the heart-shaped groove so that the cassette is locked in the pushed-in position. When pressed again, the pin comes back out of te heart-shaped groove and a spring moves an ejection slide with the cassette into the eject position. A disadvantage here is that, on each occasion, the cassette must be pushed again in order to eject it.

Another type of lifting device in a magnetic tape cassette apparatus is known from German Offenlegungsschrift No. 3229490. This lifting device is locked by a locking catch, when a cassette is lowered into the apparatus in the operating position. At the start of cassette ejection, a push pin first presses the magnetic head plate of the apparatus away in order to remove the magnetic head from the cassette. After this the cassette is lifted, whereupon the pushpin also swings away the locking catch during the further travel and then cancels the locking of the lifting device. The object of locking the lifting device in the lower position is therefore to prevent the cassette from being raised before the magnetic head has been completely removed from the cassette. This does not affect the locking of the cassette in the cassette holder, however.

SUMMARY OF THE INVENTION

The object of the invention is to construct a loading mechanism for a magnetic tape cassette apparatus so that unlocking the cassette inside the cassette holder occurs during the lifting movement and ejection of the cassette follows without further manual movement of the cassette.

The invention is therefore characterized in that a pivoting catch, in a locked position, locks a latch of the ejection slide in the pushed-in position, and can be pivoted out of the locked position by means of a tilting lever which is hingeably mounted on the catch. The tilting lever moves without any function along a control element when the cassette holder is moving downwards, and can be swung away by the control element when the cassette holder is moving upwards in such a way that the tilting lever pivots the catch out of the locked position, unlocking the ejection slide.

The tilting lever and the control element determine in what direction of travel of the lifting device the pivoting catch is brought out of its locked position and in what direction it is not.

A preferred embodiment of the loading mechanism according to the invention is characterized in that the tilting lever is double-armed and is formed as a suspended rocker. In this respect the tilting lever comprises two free arms, the first free arm of which cooperates with a trip lug of a spring-loaded control arm fitted to the frame of the magnetic tape cassette apparatus, and constituting the control element while the second free arm swings against and pivots the catch during unlocking.

To enable the device to be constructed as compactly as possible it is advantageous if the locking of the ejection slide takes place on only one side; and ejection slides, fitted on both sides of the cassette holder, work in parallel with each other. For this reason it is envisaged in accordance with another embodiment of the invention that two ejection slides are fitted on both sides of the cassette holder. These ejection slides are equipped with racks which work together with pinions, which are interconnected by a shaft. In this way, the ejection slides on both sides of the cassette holder work accurately in parallel coupled together with each other.

Since the cassette can now be ejected without any manual operation on the cassette, it is necessary for the ejection movement to be slowed down so that the cassette does not shoot out of the apparatus. In order to achieve this it is envisaged in accordance with another embodiment of the invention that a braking device is present whereby the rotary movement of the shaft is braked when the cassette holder is being raised.

Particularly for this purpose provision should be made to ensure that the braking device comprises a brake sleeve, fitted to the shaft, which is equipped with a ratchet device which locks the brake sleeve against rotational movements when the cassette holder is moving upwards, and that a braking medium between the locked brake sleeve and the shaft brakes the rotary motion of the spindle. In this respect the ratchet device consists of a ratchet gear wheel and a ratchet spring leaf cooperating with the ratchet gear wheel.

The invention is explained in greater detail on the basis of the embodiment shown in the drawing.

BRIEF DESCRIPTION OF THE DRAWING

FIGS. 3 and 4 show the parts to be locked for ejecting the cassette from the loading device in the movement phase of the unlocking and in the locked position respectively, FIG. 5 shows the loading device in accordance with FIG. 1 in the position in which a cassette is ejected and FIG. 6 is a top view of the loading device in accordance with FIG. 1 with a braking device in operation during ejection.

DESCRIPTION OF THE PREFERRED EMBODIMENT

Figure 1:
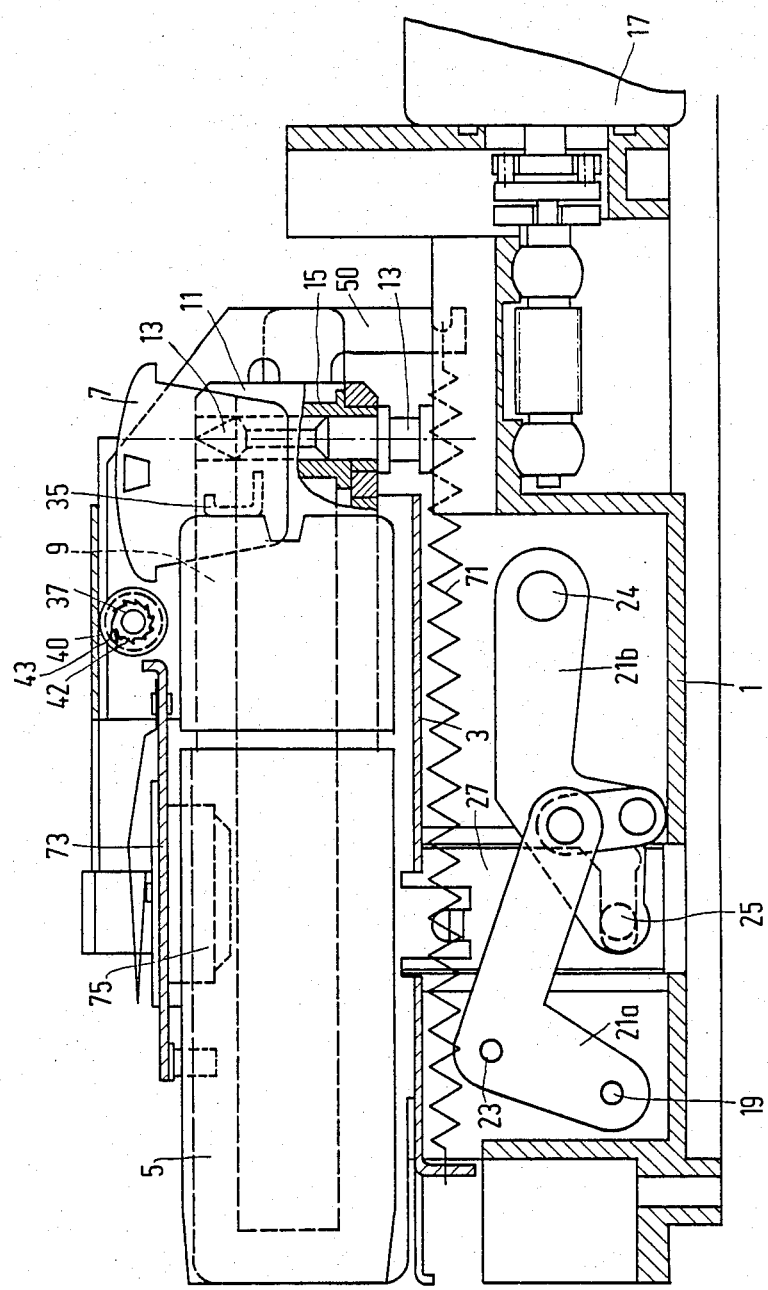
FIG. 1 is a side view, partly in section, of a part of a magnetic tape cassette apparatus, having a loading and lifting device in accordance with the invention, shown in the operating position.

In a housing 1 of a magnetic tape cassette apparatus there is a loading mechanism fitted with a frame forming cassette holder 3, into which a cassette 5 has been inserted. In this embodiment a video cassette with a cover 7, which can be swung away, and a slide 9 which can be pushed back along the cassette housing, has been loaded. In FIG. 1 the cassette has been lowered onto centering pins 13 into the cassette near the cassette front wall 11. In this way the position of the cassette 5 in the operating position is determined with respect to the apparatus. The video tape 15 is drawn into the operating position by means of a threading mechanism (not illustrated) around a head drum (also not illustrated) having a rotatable head disc carrying the magnetic heads. The threading mechanism is not described in further detail because it is not important for the invention.

Figure 2:
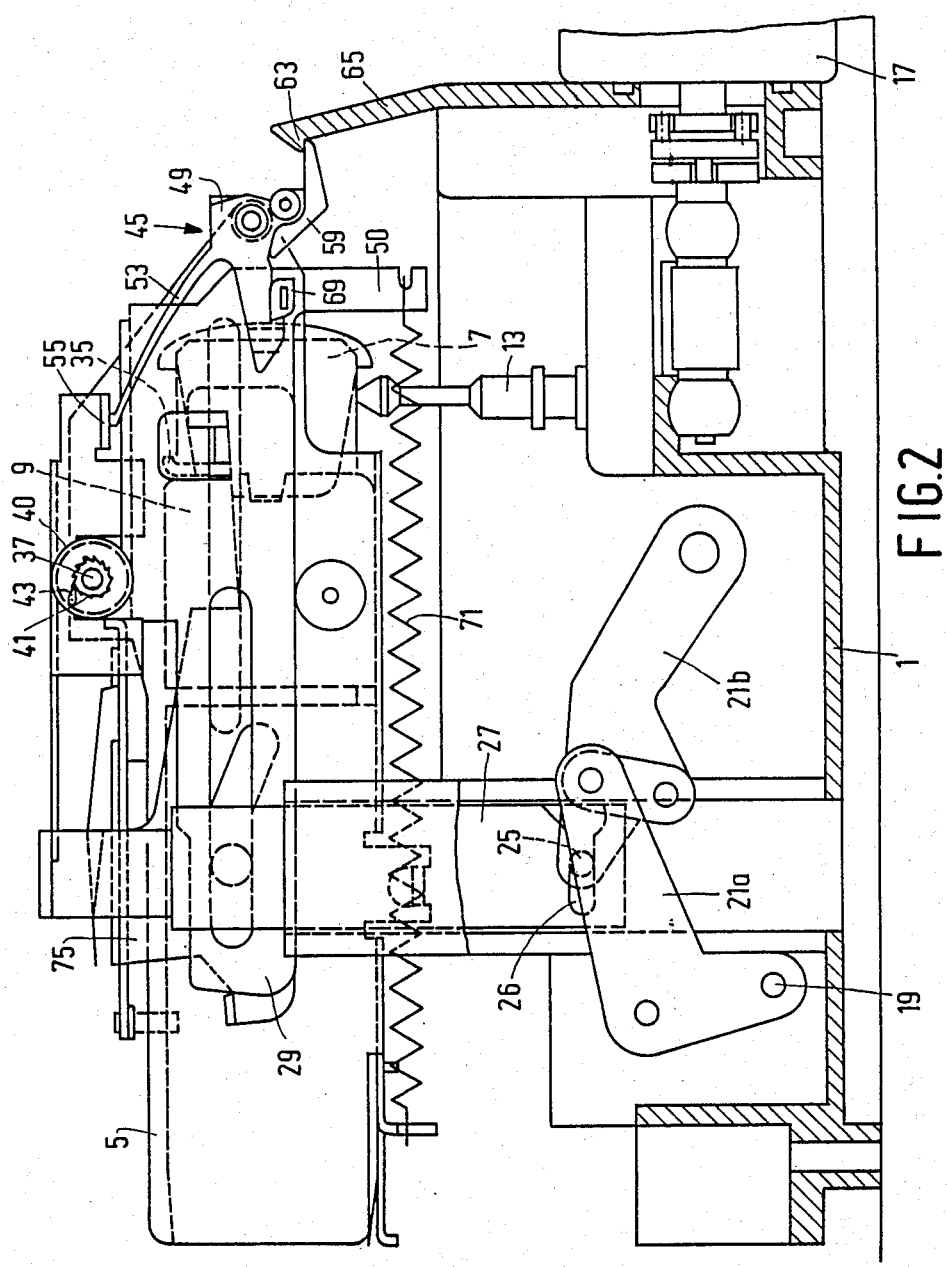
FIG. 2 shows the loading device in accordance with FIG. with the cassette holder raised.

With the aid of a lifting device the cassette holder 3 can be pushed out of the operating position shown in FIG. 1 into an eject and pull-in position shown in FIG. 2. This lifting device consists of a control motor 17 which drives a control disc which is not illustrated. A contactor with a contact pin runs over the contour of this control disc which is also not illustrated. A hinged adjusting rod fitted between the contact pin and the pivotal point of the contactor acts with the other end on a lifting lever between the swivel bearing and the free end. The free end of this lifting lever acts with the lifting pin 19 on two lifting levers 21a and 21b, which can be swivelled on pivots 23 and 24. The hinge system, consisting of lifting levers 21a and 21b which are coupled together, engages with a lifting pin 25 in grooves 26 of lifting rod 27.

In this way, the control motor 17 can bring up the cassette holder 3 by means of the control disc which is not illustrated and the lifting levers 21a and 21b as well as the lifting rods 27. As it does so, the cassette is lifted off the centering pins 13, as can be seen in FIG. 2, so that ejection of the cassette 5 is made possible.

On both sides of the cassette holder 3 slides 29 are fitted which can be moved to and fro in the direction of ejection. In FIG. 6 it can be seen that each slide 29 has a rack 31 which is engaged by a pinion 33 at a respective end of a shaft 37. The slides 29 engage the inside of the cassette holder 3 by means of catches and, in doing so, can grip behind the cassette slide 9, as can be seen in FIG. 2.

Fitted to the shaft 37 is a friction brake 39, which consists of a brake sleeve 40 and a ratchet gearwheel 41 fitted to the brake sleeve 40. A ratchet spring leaf 43, which permits the brake sleeve 40 to turn in only one direction, works together with the ratchet gearwheel 41 (FIG. 2). Between the shaft 37 and the brake sleeve 40 there is a retarding, viscous fluid lubricant, for example silicone grease.

On the cassette holder 3 provision is made for a locking device 45 which is shown in greater detail in FIGS. 2, 3 and 4. This locking device consists of a catch 49 which can be swivelled round a spindle 47 and which is provided with a hook 51. The catch 49 is made of plastic and has a moulded-on spring arm 53, which can press behind a projecting part 55 of the cassette holder 3. A double-armed tilting level 59, formed as a suspended rocker can be swivelled round another spindle 57 situated towards spindle 47. When a first free arm 61 of the lever 59 comes against a trip lug 63 of a trip arm 65, as the holder 3 finishes rising the second free arm 67 presses the pawl lever 49 upwards. As a result, a lug 69 on the slide 29 is released and tension springs 71 engaging with tension hooks of slide 29 pull the slides 29 together with the cassette 5 outwards towards the left, out of the cassette holder 3. The end of this displacement position is shown in FIG. 5, in which respect the cassette 5 is pushed far outwards out of the cassette holder 3. Together with the displacement of the slide 29 towards the left the pressure plate 73 is swung away in a manner which is not further illustrated, so that pressure pads 75 are brought outwards out of the cassette.

When the cassette holder 3 moves downwards the first free arm 61 again strikes against the trip lug 63. During this downward movement the tilting lever 59 pivots out of the way in a simple manner and the catch 49 is not touched.

The functioning during the filling of the cassette apparatus with a cassette is as follows. In FIG. 5 the cassette 5 is inserted into the cassette holder 3 towards the right in the direction of an arrow 77. Insertion ends when the lug 69 is locked behind the hook 51 of the catch 49. In the embodiment example this insertion is done entirely by hand. After this the cassette holder 3 goes down into the position shown in FIG. 1. The tilting lever 59 travels along the trip lug 63 and the cassette 5 remains locked in the inserted position. During the downward travel the ratchet spring leaf 43 has brushed over the teeth of the ratchet gear wheel 41. The friction brake 39 therefore does not engage during this downward movement.

If the recording and/or playback of the cassette is ended and it has to be ejected, the cassette holder 3 is brought up by operating the control motor 17. During the upward travel the first free arm 61 strikes against the trip lug 63 and the catch 49 moves upwards under the influence of the second free arm 67. The lug 69 which has now become free makes it possible for the spring 71 to push the cassette 5 outwards. This movement is slowed down because now the ratchet spring leaf 43 comes against a tooth of the ratchet gear wheel 41. As a result, the brake sleeve 40 is blocked and the spindle 37 is slowed down by means of the grease between brake sleeve 40 and the spindle 37. As a result of this, ejection is greatly slowed down.

What is claimed is:

1. A loading mechanism for a magnetic tape cassette apparatus comprising a cassette holder having an ejection slide movable with respect to the holder between an outward position and a pushed-in position, means for locking the ejection slide in the pushed-in position, and a lifting device arranged for moving said cassette holder up and down when the cassette is in said pushed-in position, characterized by comprising a latch on said ejection slide, a pivoting catch pivotally mounted on said holder, said catch being pivotable to a locked position for engaging said latch when the slide is in the pushed-in position, a tilting lever, and means mounting said tilting lever to said holder to permit pivotable movement of said lever with respect to said holder and said catch, and a control element arranged to engage said tilting lever when the cassette holder is moved upwards and downwards, arranged such that said tilting lever moves along said control element without performing any function during one of the directions of cassette holder movement, and that during movement of holder in the other direction the tilting lever engages said control element and the catch so as to pivot the catch out of the locked position, thereby unlocking the ejection slide for movement toward said outward position.

2. A mechanism as claimed in claim 1, characterized in that said tilting lever is hingeably mounted on said catch.

3. A mechanism as claimed in claim 2, characterized in that said catch comprises a spring-loaded tongue having a free end, said free end resting against the cassette holder and urging the catch toward the locked position.

4. A mechanism as claimed in claim 1, characterized in that said tilting lever has two arms, and is formed as a rocker suspended from said catch.

5. A mechanism as claimed in claim 4, characterized in that said apparatus comprises a frame having a spring-loaded control arm fitted thereto, said control arm including a lug which constitutes said control element, and said tilting lever arms are arranged such that a first arm engages said lug during movement of the holder in said one direction, thereby pivoting the other arm away from said catch; and during movement of the holder in the other direction, the second arm is swung against the catch to pivot the catch for unlocking.

6. A mechanism is claimed in claim 2, characterized in that said catch comprises a spring-loaded tongue having a free end, said free end resting against the cassette holder and urging the catch toward the locked position.

7. A mechanism as claimed in claim 5, characterized in that said holder comprises two said ejection slides, said catch engaging a latch on one of said slides; each of said slides includes a rack extending in the direction of ejection slide movement; and the apparatus further includes a shaft having two pinions fixed thereto, each pinion engaging a respective rack, coupling the slides for movement together.

8. A loading mechanism for a magnetic tape cassette apparatus comprising a cassette holder having an ejection slide movable with respect to the holder between an outward position and a pushed-in position, means for locking the ejection slide in the pushed-in position, and a lifting device arranged for moving said cassette holder up and down when the cassette is in said pushed-in position, characterized by comprising a latch on said ejection slide, a pivoting catch pivotally mounted on said holder, said catch being pivotable to a locked position for engaging said latch when the slide is in the pushed-in position, a tilting lever, and means mounting said tilting lever to said holder to permit pivotable movement of said lever with respect to said holder and said catch, a control element arranged to engage said tilting lever when the cassette holder is moved upwards and downwards, arranged such that said tilting lever moves along said control element without performing any function during one of the directions of cassette holder movement, and that during movement of holder in the other direction the tilting lever engages said control element and the catch so as to pivot the catch out of the locked position, thereby unlocking the ejection slide for movement toward said outward position, two said ejection slides fitted to opposite sides of the cassette holder, said catch being arranged to engage one of said slides; each slide comprising a rack which extends in the direction of ejection slide movement, a shaft rotatably mounted to said holder, having two pinions fixed thereto, each pinion engaging a respective rack, thereby coupling said ejection slides for movement together, and a braking device for braking rotation of said shaft in one direction only, corresponding to movement of said slides from the pushed-in to the outward position.

9. A mechanism as claimed in claim 8, characterized in that said braking device comprises a brake sleeve fitted about said shaft, a braking medium between said sleeve and said shaft, and a ratchet device for locking rotation of the brake sleeve in said one rotational direction when the cassette holder is moving in said other direction.

10. A mechanism as claimed in claim 9, characterized in that said ratchet device consists of a ratchet gearwheel, and a spring leaf mounted to said holder and engaging said ratchet gear wheel.

* * * * *